United States Patent
Morariu et al.

(10) Patent No.: US 10,878,173 B2
(45) Date of Patent: Dec. 29, 2020

(54) OBJECT RECOGNITION AND TAGGING BASED ON FUSION DEEP LEARNING MODELS

(71) Applicant: Adobe Inc., San Jose, CA (US)

(72) Inventors: Vlad Morariu, Potomac, MD (US); Rajiv Jain, Vienna, VA (US); Nishant Sankaran, Tonawanda, NY (US)

(73) Assignee: Adobe Inc., San Jose, CA (US)

(*) Notice: Subject to any disclaimer, the term of this patent is extended or adjusted under 35 U.S.C. 154(b) by 172 days.

(21) Appl. No.: 16/204,918

(22) Filed: Nov. 29, 2018

(65) Prior Publication Data

US 2020/0175095 A1    Jun. 4, 2020

(51) Int. Cl.
  *G06F 40/117* (2020.01)
  *G06N 5/04* (2006.01)
  *G06K 9/62* (2006.01)
  *G06K 9/00* (2006.01)

(52) U.S. Cl.
  CPC ........ *G06F 40/117* (2020.01); *G06K 9/00469* (2013.01); *G06K 9/6288* (2013.01); *G06N 5/046* (2013.01)

(58) Field of Classification Search
  CPC .............. G06K 9/00469; G06K 9/6288; G06F 40/117; G06N 5/046
  USPC ....................................................... 382/182
  See application file for complete search history.

(56) References Cited

U.S. PATENT DOCUMENTS

| 2003/0152277 A1* | 8/2003 | Hall, Jr. ............. G06K 9/00463 382/229 |
| 2014/0247977 A1* | 9/2014 | Han ........................ G06K 9/34 382/159 |

FOREIGN PATENT DOCUMENTS

CN          108228845 A  *  6/2018

OTHER PUBLICATIONS

Huang, Jia Bin, et al., "Temporally Coherent Completion of Dynamic Video", ACM Transactions on Graphics, vol. 35, Issue 6, Article No. 196, Nov. 2016.

(Continued)

*Primary Examiner* — Wednel Cadeau
(74) *Attorney, Agent, or Firm* — Kilpatrick Townsend & Stockton LLP

(57) ABSTRACT

In some embodiments, a computing system computes tags for an electronic document. The computing system identifies sets of objects for the electronic document by applying a set of object-recognition rules to the electronic document, with each object-recognition rule generating a set of identified objects. The computing system generates feature maps that represent a set of identified objects. The computing system generates a heat map that identifies attributes of the electronic document including object candidates of the electronic document by applying a page-segmentation machine-learning model to the electronic document. The computing system computes a tag by applying a fusion deep learning module to the feature map and the heat map to correlate a document object identified by the feature map with an attribute of the electronic document identified by the heat map. The computing system generates the tagged electronic document by applying the tag to the electronic document.

17 Claims, 7 Drawing Sheets

(56) References Cited

OTHER PUBLICATIONS

Huang, Jia Bin, et al., "Temporally Coherent Completion of Dynamic Video", https://filebox.ece.vt.edu/~jbhuang/project/vidcomp/index.html, Accessed Jan. 25, 2019, 1 page.

* cited by examiner

OBJECT RECOGNITION AND TAGGING BASED ON FUSION DEEP LEARNING MODELS

TECHNICAL FIELD

This disclosure relates generally to transforming an electronic document into a tagged electronic document by applying a fusion deep learning model that integrates object-recognition approaches that use both machine-learning models and user-defined rules.

BACKGROUND

Due to the wide adoption of electronic documents and the advances in analytical capabilities and other processing of electronic documents by computing systems, methods for categorizing and identifying regions of documents have been developed. For instance, certain object recognition processes enable a computing system to automatically identify and categorize regions of the electronic document. In one example, object recognition (e.g., page segmentation) involves categorizing certain regions of a document as paragraphs, tables, etc. In another example, object recognition involves categorizing certain regions of an image as depicting certain people or objects. A computing system that has identified and categorized a region of an electronic document can add or update a metadata tag of the electronic document that describes the identified objects.

One example of an object recognition technique is a rule-based approach, such as an expert system. An expert system generates output tagged electronic documents based on user-defined rules. For instance, an expert system could include a first rule categorizing text regions of a document as a "paragraph" object if the regions can be fully enclosed by a first bounding box with a first set of dimensions, as well as a second rule categorizing other document regions as a "table" object if the regions can be fully enclosed by a second bounding box with a second set of dimensions. An expert system can process complex document inputs (e.g., documents with multiple pages, documents with embedded images, documents with embedded tables, etc.) and outputs tagged electronic documents having metadata describing the objects recognized with user-defined rules. While an expert system can deliver a precisely tagged document based on predefined sets of document features, such an expert system is often unable to recognize document features that do not exactly match the user-defined rules. Therefore, expert systems fail to recognize and tag document features that deviate from the user-defined rules. Expert systems also must be updated manually which is costly, inefficient, and not sufficient for the rapidly changing uses and adoption of electronic documents.

Another example of an object recognition technique is a machine-learning approach, where a computing system applies a machine-learning model to an electronic document and thereby detects and tags objects in the electronic document. A machine-learning model can tag objects using pixel-wise determinations that propagate detected object types from a given set of pixels to a nearby set of pixels. These models can be trained on a wide range of documents to identify a wide variety of object types. However, machine learning systems often require large training datasets to account for various types of circumstances that may be encountered. In some cases, insufficient training data can cause machine learning systems to fail to produce a precise, accurately tagged document based on exposure to circumstances that the machine learning systems have not previously encountered, such as documents with object types, layouts, or other features that are significantly different from examples that were used to train the machine learning systems A machine-learning model relies on a pixel-wise determination that may confuse objects lacking precise, defined edges. In one example, if two objects are close to one another, pixels from the first object (e.g., a paragraph) that neighbor pixels from the second object (e.g., a table within the paragraph) may be mischaracterized as having the second object type (e.g., portions of a paragraph being tagged as a "table" object). In another example, the machine-learning model may improperly classify pixels as being white space (e.g., no objects present) if the pixels are located between two objects that are in close proximity to each other. Thus, machine-learning systems may produce a tagged document with improperly tagged pixels or regions.

Thus, current object-recognition systems are often limited to rule-based approaches or machine-learning models, both of which include deficiencies that cause objects to be inaccurately tagged. Therefore, existing solutions may involve disadvantages for reasons such as (but not limited to) those described above.

SUMMARY

Certain embodiments involve transforming an electronic document into a tagged electronic document having tags that identify categories of document objects in the tagged electronic document. For instance, an electronic document processing application generates a tagged electronic document from an input electronic document. The electronic document processing application identifies sets of identified objects for the electronic document by applying a set of object-recognition rules to the electronic document, where each object-recognition rule generates a respective set of identified objects. The electronic document processing application generates feature maps from the sets of identified objects. The electronic document processing application represents a set of identified objects as a feature map. The electronic document processing application generates a heat map of the electronic document by applying a page-segmentation machine-learning model to the electronic document. The electronic document processing application identifies attributes of the electronic document including object candidates that is represented by a heat map. The electronic document processing application computes a tag by applying a fusion deep learning module to the feature map and the heat map, wherein the fusion deep learning module correlates a document object identified by the feature map with an attribute of the electronic document identified by the heat map. The electronic document processing application generates the tagged electronic document by applying the tag to the electronic document.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
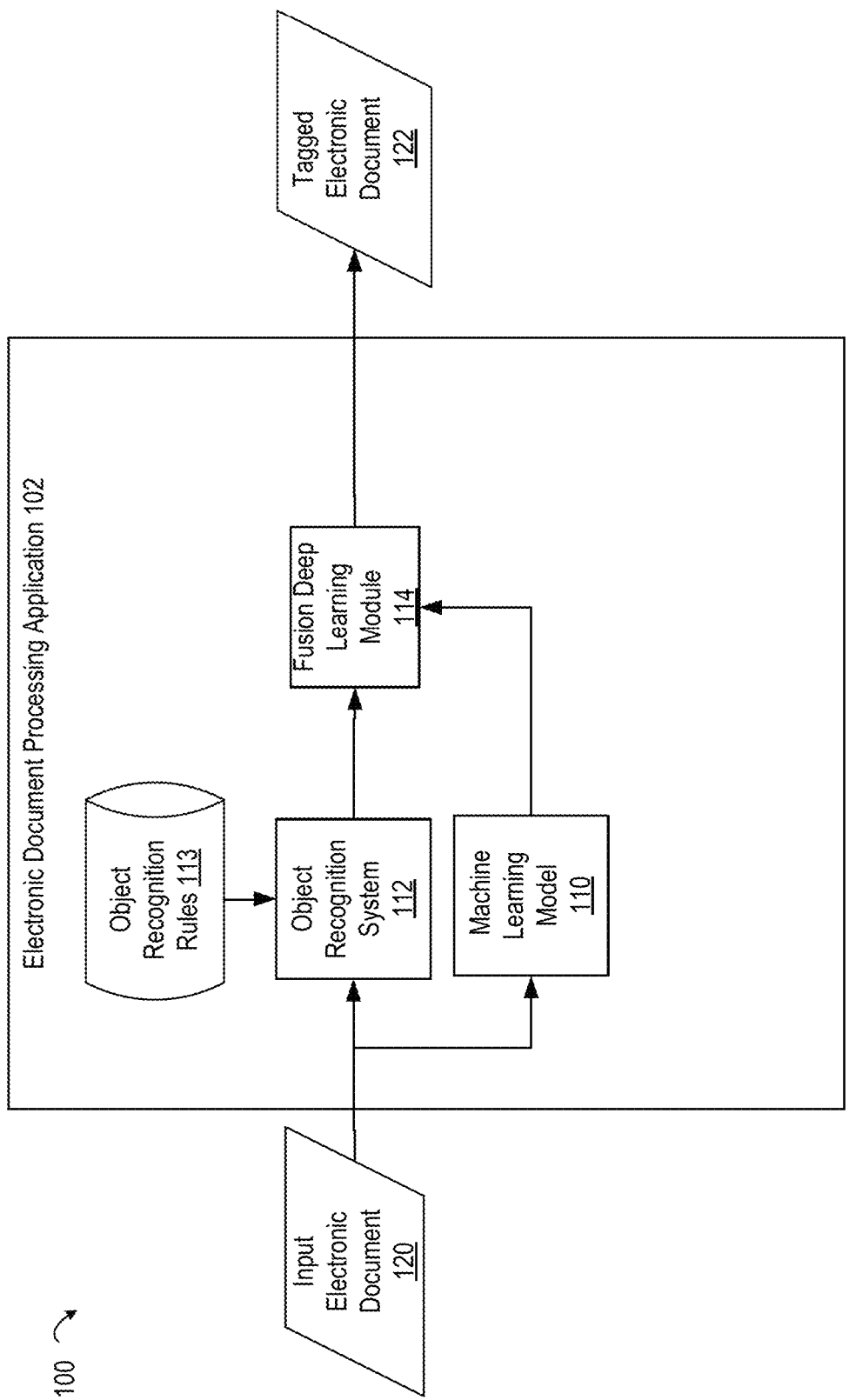
FIG. 1 depicts a computing environment in which an electronic document processing application receives an input document and generates a tagged electronic document, according to certain embodiments of the present disclosure.

Certain embodiments involve transforming an electronic document into a tagged electronic document by applying a fusion deep learning model that integrates object-recognition approaches that use both machine-learning models and user-defined rules. These embodiments can locate objects by integrating certain features of machine-learning and rule-based techniques, thereby leveraging the advantages of both techniques and while avoiding errors involved in each technique. For instance, machine-learning model techniques may be used to identify features of a document that are not addressed by user-defined rules, and user-defined rules techniques may be used to identify features of the document that are insufficiently similar to training examples used to configure the machine-learning model.

The following non-limiting example is provided to introduce certain embodiments. In this example, an electronic document processing application transforms an input electronic document (i.e., a PDF document, an image document) into a tagged electronic document. The transformation involves determining and applying tags that identify categories of document objects in the input electronic document. To do so, the electronic document processing application first identifies sets of objects in the electronic document by performing a set of object-recognition rules to the electronic document. An object recognition rule is a predefined set of parameters that define a particular object (e.g., a "paragraph" object has a height of more than one line, and a width equal to the full page width). Performing a given object-recognition rule generates a respective set of identified objects (i.e., a complex format such as a structural hierarchy that indicates object information). The electronic document processing application generates feature maps (i.e., a tensor representing the features of the objects) from the sets of objects identified with the object-recognition rules. For instance, the feature map could have multiple dimensions, such as a first dimension having a range of values corresponding to different vertical positions across an analyzed document, a second dimension having a range of values corresponding to different horizontal positions across the analyzed document, and a third dimension corresponding to different object types that could be identified with one or more object-recognition rules.

Continuing with this example, the electronic document processing application also applies a page-segmentation machine-learning model that generates a pixel-wise heat map of the electronic document. The heat map identifies attributes of the electronic document, including object candidates, on a per pixel level. Accordingly, each element of the heat map is defined by parameters that correspond to the position of the pixel at a height "h," a width "w," and the object candidate information "d." The object candidates identified with the machine-learning model can be types of objects (i.e., text line, image, or components) that make up an object. Each pixel in the heat map is assigned a value that indicates an object candidate depicted (at least in part) by the pixel.

Continuing with this example, the electronic document processing application computes a tag for each object by applying a fusion deep learning model to the feature map and the heat map, thereby integrating outputs from the rule-based technique and the machine-learning technique. The fusion deep learning model correlates a document object identified by the feature map with a candidate object of the electronic document identified by the heat map. The electronic document processing application performs, via the fusion deep learning model, a novel spatial cross correlation analysis to determine the tag for the object or attribute. The electronic document processing application generates a tagged electronic document by applying each of the computed tags to the input electronic document.

As described herein, certain embodiments provide improvements to object recognition and tagging by using an expert system combined with a machine learning approach. Generating feature maps with user-defined rules enables the results of the user-defined rules to be provided to external processes (e.g., a deep learning model). Accordingly, the feature maps generated from rule-based techniques can be provided as inputs to a fusion deep learning model to achieve improved accuracy in generating a tagged electronic document from an input electronic document.

As used herein, the term "electronic document" is used to refer to an electronic document (including images) having a data object (i.e., a field, a table, image, text, lines of text) and metadata identifying the data object. The electronic document can be local to a device, or a web-based platform, such as a webpage. In some embodiments, an object can be a text block, paragraph block, image data, document property, file type, or page segmentation. For instance, an object can be used to represent components of an electronic document such that the features of the document can be extracted.

As used herein, the term "electronic document processing application" is used to refer to a software application being executed on an electronic server, or group of servers that perform operations on electronic documents as described herein.

As used herein, the term "object recognition engine" is used to refer to one or more software applications that perform operations using one or more feature extraction rules. In some embodiments, the object recognition engine can be an expert system that extracts features based on a set of known predefined rules.

As used herein, the term "object" is used to refer to properties or components of an electronic document such as text, lines of text, paragraph, images, tables, metadata, or similar properties. In some embodiments, objects are page segmentation elements that describe the visual content of a page in an electronic document. In an alternative embodiment, objects are image components or segments of an image defining a visual object within a larger image.

Referring now to the drawings, FIG. 1 depicts a computing environment in which an electronic document processing application receives an input document and generates a tagged electronic document, according to certain embodiments of the present disclosure. In various embodiments, the computing environment 100 includes an electronic document processing application 102. The electronic document processing application 102 is a software application for processing input electronic document 120.

In a non-limiting example, the electronic document processing application 102 receives an input electronic document 120. One example of the input electronic document 120 is a document including various text objects, such as a plain text document, a document in a portable document format (PDF), a document having rich text or HTML elements, a slideshow presentation, etc. Another example of an input electronic document 120 is an image file with graphical content that depicts text, such as a scanned image of a document. An additional or alternative example of an input electronic document 120 is an image file containing a natural image (e.g., an image with no text content).

The input electronic document 120 is processed by an object recognition engine 112 and a machine-learning object-detection model 110. In the present example, the input electronic document 120 is processed by both the object recognition engine 112 and the machine-learning object-detection model 110. For instance, the object recognition engine 112 processes the input electronic document 120 to detect a set of objects from input electronic document 120. An example of the object recognition engine 112 is an expert system that uses object recognition rules 113 to detect objects of the input electronic document 120. The object recognition engine 112 performs page segmentation by iteratively applying object recognition rules 113.

An example of object recognition rules 113 is a list of predetermined regions with corresponding bounding boxes that enclose an object of input electronic document 120. Examples of object recognition rules 113 are "line of text," "paragraph," or "image" that are defined by bounding boxes of certain dimensions. For example, an object recognition rule 113 for recognizing a paragraph determines that a region of text likely corresponds to a paragraph object if the region can be enclosed by a bounding box having a width that is equal to the width of electronic document and a height that is greater than one line of text. Other object recognition rules 113 can recognize other text regions as being other types of objects based on those other text regions being enclosed within differently sized bounding boxes (e.g., an "image" bounding box that is narrower than a column, a "line" bounding box with a height no great than one line, etc.). In an alternative example, the object recognition rules 113 is a list of predetermined regions of a natural image (e.g., face, facial features, vehicle types/models, animal species, etc.).

The object recognition engine 112 applies each of the object recognition rules 113 by iteratively applying each object recognition rule to regions of the input electronic document 120 and assigning regions to certain object types based on the bounding box used by the object recognition rule. Thus, in each iteration, a single object recognition rule would detect regions contained in input electronic document 120 that match the object recognition rule parameters. The object recognition engine 112 stores the results of applying each object recognition rule 113 as a state. A state can include, for example, an identifier of the object recognition rule that has been applied, a location in the electronic document in which the object recognition rule has been applied, and the type of region identified by the object recognition rule. As a simplified example, one state could indicate that a "paragraph" object recognition rule was applied and that a certain regions in the electronic document were identified as "paragraph" objects, and another state could indicate that an "image" object recognition rule was applied and that other regions in the electronic document were identified as "picture" objects.

If multiple object recognition rules are applied, storing these states can require a complex data storage format. To address this issue, the object recognition engine 112 can generate a state data object that represents, using a set of parameters stored in a feature map, a state of the object recognition engine 112. In an example, the state data object is a state feature map representing the results of applying a set of object recognition rules 113.

In a non-limiting example, a rule feature map for a particular object recognition rule can have a tensor with a shape of ($H_{OR}$, $W_{OR}$, $D_{OR}$). In this example, the state feature map has three dimensions. The term $H_{OR}$ is an integer representing the size of a first dimension, which corresponds to the height of input electronic document 120 in this example. The term $W_{OR}$ is an integer representing the size of a second dimension, which corresponds to the width of input electronic document 120 in this example. The term $D_{OR}$ is an integer representing the size of a third dimension, which corresponds to a number of object types in this example. This three-dimensional rule feature map for a particular object-recognition rule is indexed by a three-dimensional index (h, w, d), where h is an integer having possible values [1 ... $H_{OR}$], w is integer having possible values [1 ... $W_{OR}$], and d is an integer having possible value integer having possible values [1 ... $D_{OR}$]. For instance, if a state feature map is a three-dimensional array of numbers having a height, width, and depth, then (h, w, d) refers to the real number value in row h, column w, and depth d. For instance, the real number value in row h, column w, and depth d may be a binary value that indicates presence "1" or absence "0" of an object type stored at a particular index. A tensor size of the state feature map ($H_{OR}$, $W_{OR}$, $D_{OR}$) can be the number of values contained with the state feature map, i.e., $H_{OR}*W_{OR}*D_{OR}$.

In one example, the object recognition engine 112 applies, in a first iteration, an object recognition rule 113 that detects an object having a "paragraph" type. The object recognition engine 112 defines an object of type "paragraph" as a region of text enclosed by a bounding box that has dimensions of a height greater than 1, and a width equal to the page width. The object recognition engine 112 stores the coordinates and object type for each region after the object recognition rule has been performed. In this example, the object recognition engine 112 stores data indicating that an object "paragraph" is present at certain coordinates in the input electronic document 120. As noted above, a rule feature map for a particular rule can have the shape ($H_{OR}$, $W_{OR}$, $D_{OR}$). The object recognition engine 112 generates the feature map for this example by setting the values of a rule feature map at each index (h, w, d) of the rule feature map with shape ($H_{OR}$, $W_{OR}$, $D_{OR}$) such that the rule feature map represents, as a tensor, that the "paragraph" object has been identified at one or more locations in a page or document.

Continuing with this example, a value of 1 at a particular index ($h_i$, $w_i$, $d_i$) of the rule feature map indicates that the object recognition engine 112 has identified the corresponding pixel of the input electronic document 120 at position $(h_i, w_i)$ as having the object type corresponding to the real number value of $d_i$. $D_{OR}$. Thus, a value of "1" in the feature map for an index $(h_1, w_1, d_1)$, indicates that, at a location of the input electronic document 120 represented by position $(h_1, w_1)$, the object type corresponding to $d_1$ (e.g., "paragraph") was detected. Similarly, a value of "1" in the feature map for an index $(h_1, w_1, d_2)$, indicates that, at a location of the input electronic document 120 represented by position $(h_1, w_1)$, the object type corresponding to $d_2$ (e.g., "line") was detected. In some cases, object recognition rules may apply to the various types of object (e.g., a rule that recognizes paragraphs, a rule that recognizes images, etc.). Conversely, in this example, a value of "0" in the feature map for an index $(h_2, w_2, d_2)$, indicates that, at a location of the input electronic document 120 represented by position $(h_2, w_2)$, the object type corresponding to $d_1$ (e.g., "paragraph") was not recognized.

In some embodiments, rule feature maps from multiple object recognition rules are combined into a state feature map that represents the application of multiple object-recognition rules. For instance, a state feature map can have a shape $(R_{OR}, H_{OR}, W_{OR}, D_{OR})$. The term $R_{OR}$ is an integer representing the size of another dimension, which corresponds to the total number of object recognition rules 113 that could be applied to the input electronic document 120. The other terms in the state feature map are used in the same manner as the example above. Here, a four-dimensional tensor state feature map is indexed by a four-dimensional index (r, h, w, d), where r is an integer having possible values $[1 \ldots R_{OR}]$, h is an integer having possible values $[1 \ldots H_{OR}]$, w is integer having possible values $[1 \ldots W_{OR}]$, and d is an integer having possible value integer having possible values $[1 \ldots D_{OR}]$. In this example, the real number value at a particular index $(r_i, h_i, w_i, d_i)$ may be a binary value that indicates presence "1" or absence "0" of an object stored at the $i^{th}$ index.

In this example, if a number of $R_{OR}$ object recognition rules 113 are applied to an electronic document 120, the object recognition engine 112 generates a corresponding number $R_{OR}$ of the rule feature maps described above. The object recognition engine 112 represents the application of the $R_{OR}$ object recognition rules 113 by generating a four-dimensional state feature map having the shape $(R_{OR}, H_{OR}, W_{OR}, D_{OR})$. For example, the object recognition engine 112 could apply 100 object recognition rules. The object recognition engine 112 generates a rule feature map for each of the 100 object recognition rules 113. In this example, the object recognition engine 112 represents the 100 feature maps by a single state feature map, such as a four-dimensional tensor with a shape of $(100, H_{OR}, W_{OR}, D_{OR})$.

In some cases, the object recognition engine 112 can determine a subset of rules that generate the most significant feature maps. A set of "most significant" feature maps can be the feature maps with the least inter-map similarity. In a simplified example involving a document with regions A-D, a set of dissimilar feature maps could include a first feature map in which only region A is recognized as an object by a first object rule, only regions B and C are recognized as a different object by a second object rule, and only region D is recognized as yet another type of object by a third object rule. To select a set of most significant (i.e., least similar) feature maps, the object recognition engine 112 compares the binary values for various feature maps that are generated by applying various object recognition rules. The object recognition engine 112 excludes, from the set of "significant" feature maps, certain feature maps that contain duplicative values or lack objects.

An example of duplicative values is a feature map that identifies four sequential lines of text in a particular location (i.e., region A includes four "line" object) and another feature map that identifies a paragraph in the same location (i.e., region A includes one "paragraph" object). The object recognition engine 112 discards the feature map that indicates the four sequential lines of text by determining that the actual object is a paragraph. The object recognition engine 112 performs comparisons to output a set of feature maps (i.e., state representations) that is less than the total number of states generated by applying all object recognition rules. For instance, rather than a tensor with a shape of $(100, H_{OR}, W_{OR}, D_{OR})$ generated by applying 100 object recognition rules, a tensor with a shape of $(25, H_{OR}, W_{OR}, D_{OR})$ corresponding to the most significant feature maps (i.e., rules) is generated. In some embodiments, the reduction in size of each tensor dimension to include the most significant feature maps can significantly lower the computational costs of performing computations on the tensor.

In some embodiments, described in further detail herein, the electronic document processing application 102 can reshape one or more tensors used for document processing. Reshaping a tensor involves modifying a shape of the tensor into a different shape without changing the number of elements. For instance, a four-dimensional tensor A of shape (R, H, W, D) can be reshaped for stacking with a second tensor B (H, W, D). To do so, the electronic document processing application 102 can select the tensors $A_1 = A(1, :, :, :), A_2 = A(2, :, :, :), \ldots, A_R = A(R, :, :, :)$. In other words, the tensor $A_1 = A(1, :, :, :)$ represents the H*W*D values in the tensor A for all indexes that have R=1. The electronic document processing application 102 can reshape each of the tensors $A_1 \ldots A_R$ to size (H, W, D). The electronic document processing application 102 can stack the tensors $A_1 \ldots A_R$ of size (H, W, D) along a third dimension.

Machine-learning object-detection model 110 also processes the input electronic document 120 to generate heat maps of the electronic document. A machine-learning object-detection model 110 can apply a deep learning model that determines an attribute for each pixel of the input electronic document 120. For instance, machine-learning object-detection model 110 generates a pixel-wise heat map of input electronic document 120. An example of the pixel-wise heat map is a tensor representation of attributes of the input electronic document 120. For example, the pixel-wise heat map determines an attribute for each pixel location (e.g., a pixel is a member of a text box, line of text, table, image, etc.)

The object recognition engine 112 and the machine-learning object-detection model 110 provide the feature map and the heat map, respectively, to a fusion deep learning module 114, which can execute one or more processes that apply a fusion deep learning model, such as a convolutional neural network. The fusion deep learning module 114 computes tags to be applied to the input electronic document 120. An example of a tag is an assignment of an object to a defined type such as "paragraph" or "image." The fusion deep learning module 114 stacks the heat map and feature map along a dimension.

Stacking the heat map and feature map is a method of concatenating the feature maps along a dimension. The resulting stacked tensor will then include data in the dimension of interest for various locations in the input electronic document 120. For example, stacking a tensor of shape (2, 2, 5) with a tensor of shape (2, 2, 10) along the third dimension will result in a stacked tensor of shape (2, 2, 15). The electronic document processing application 102 generates a tagged electronic document 122 by applying, to the input electronic document 120, one or more of the tags generated with the fusion deep learning module 115. The fusion deep learning module 114 is described in further detail elsewhere herein, particularly with reference to FIGS. 3 and 4.

Figure 2:
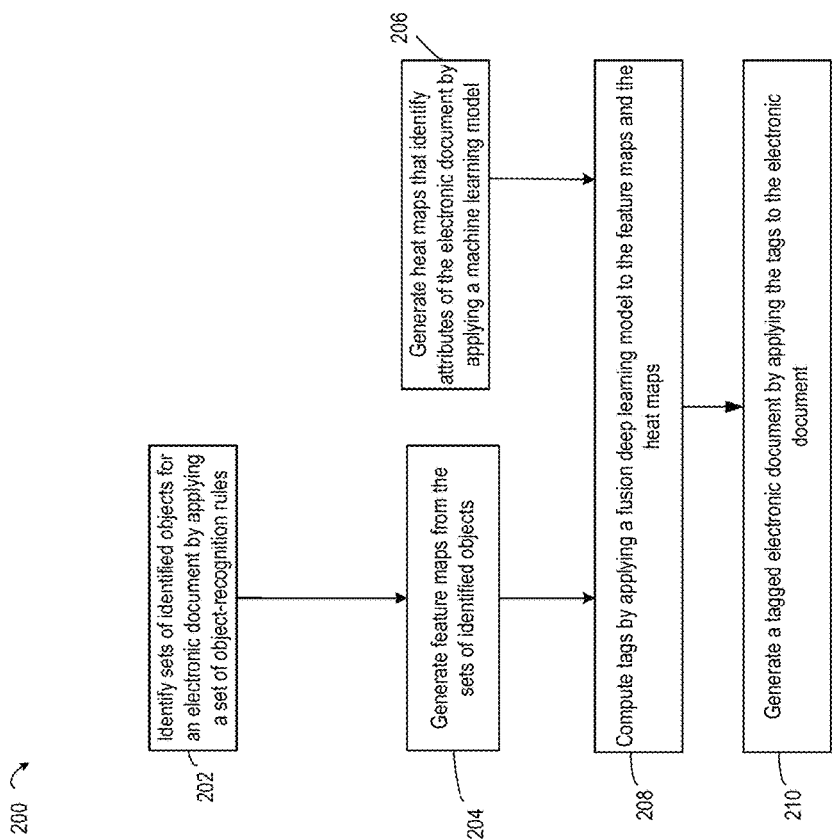
FIG. 2 depicts a process for computing tags by applying a fusion deep learning module to feature maps and heat maps, according to certain embodiments of the present disclosure.

FIG. 2 depicts a process 200 for computing tags by applying a fusion deep learning module 114 to feature maps and heat maps. One or more computing devices or software applications (e.g., the electronic document processing application 102) implement operations depicted in FIG. 2 by executing suitable program code. For illustrative purposes, the process 200 is described with reference to certain examples depicted in the figures. Other implementations, however, are possible.

At block 202, the process 200 involves identifying sets of identified objects for an electronic document by applying a set of object recognition rules 113. The object recognition engine 112, operating as an expert system, detects a set of objects that describe components of the electronic document by applying a set of object recognition rules 113. For instance, the electronic document may contain components that can be defined as objects such as a text box, embedded image, block of text, image object, or metadata property of the electronic document. The object recognition engine 112 applies the object recognition rules 113 to the input electronic document 120. Each of the object recognition rules 113 detects a predetermined object type by searching the electronic document for identifying features that match the object recognition rules 113.

In a non-limiting example, one object recognition rule could be used for identifying text paragraph objects. The object recognition rule identifies text paragraphs by detecting regions of text in an input electronic document 120 and determining a bounding box having a particular shape that encloses the detected region. The object recognition rule determines that the bounding box matches a text paragraph object based on the dimensions. For instance, the object recognition rules define a bounding box of height "1 line" and width of "1 page width" as a line of text, while defining a bounding box of "2 or more lines" and width of "1 page width" as a paragraph (e.g., a paragraph must contain multiple consecutive lines of text. Shapes other than bounding boxes and various polygons may be used for detecting regions (e.g., circle, ellipse, regular/irregular polygon, any other planar region), and other properties of the detected regions may be utilized to determine the identified object.

At block 204, the process 200 involves generating feature maps from the set of identified objects discussed in relation to block 202. The object recognition engine 112 generates the feature maps by applying the object recognition rules 113. For instance, the object recognition engine 112 stores the result of each application of an object recognition rule 113, which cumulatively represent the set of objects, as a rule feature map. The object recognition engine 112 represents the set of identified objects by a state feature map.

Figure 3:
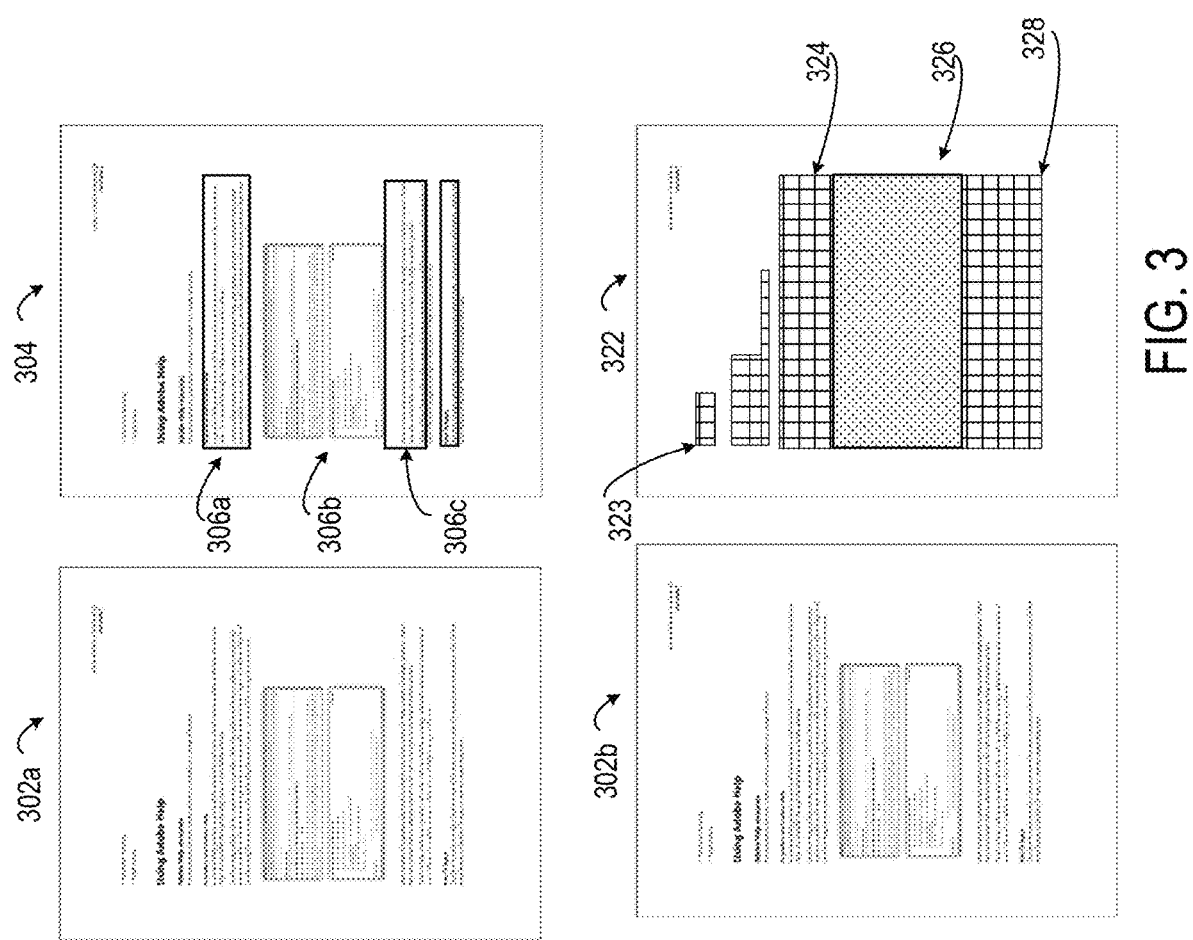
FIG. 3 depicts an example of object recognition that can generate a feature map and heat map, according to certain embodiments of the present disclosure.

For instance, FIG. 3 depicts an example of object recognition that can be used for generating a feature map and heat map, according to certain embodiments of the present disclosure. In some embodiments, the object recognition engine 112 performs object recognition rules 113 to determine objects contained in the electronic document 302a. The electronic document 304 includes an example of bounding boxes applied by the object recognition engine 112 during the performance of object recognition rules 113. The object recognition engine 112 performs object recognition rules 113 and identifies a set of objects 306a, 306b, 306c. In this example, the first object recognition rule identifies an object "paragraph." The object recognition engine 112 identifies objects 306a and 306c to meet the parameters of the first object recognition rule. The object recognition engine 112 generates a tensor representation (e.g., a rule feature map) indicating the presence of these identified objects.

Returning to FIG. 2 at block 204, in some embodiments, the electronic document processing application 102 represents, as a first tensor, the result of applying a sequence of object recognition rules by the object recognition engine 112. The object recognition engine 112 iteratively performs each rule from object recognition rules 113. The object recognition engine generates a first tensor that represents the objects detected by applying the set of object recognition rules 113.

Due to the nature of the object recognition engine 112 as an expert system, the electronic document processing application 102 generates feature representations of additional data about input electronic document 120. For example, the object recognition engine 112 decomposes a series of page images from input electronic document 120. The object recognition engine 112 decomposes the input electronic document 120 into a series of page images that include an RGB image (or each component), a raster representation, or other types of page images. The page image decomposition layers are multiple representations of the graphical layout of input electronic document 120. The object recognition engine 112 determines complex features regarding the type of object from the series of page images (i.e., lines of text that form a paragraph, a paragraph that is a block of text of non-standard shape, an image the size of a paragraph, a table that is fits the object recognition rule for images) that further discriminates between types of objects. The electronic document processing application 102 converts the complex features into a feature map with a shape of ($H_{PI}$, $W_{PI}$, $D_{PI}$), which is represented by a second tensor.

The electronic document processing application 102 generates a combined tensor by stacking, along a dimension of the first tensor (e.g., the tensor generated from the object recognition rules) and the second tensor (e.g., the tensor generated from the complex features). This stacking of the first tensor and the second tensor forms a stacked feature map. The combined tensor has dimensions ($H_C$, $W_C$, $D_C$), where $H_C=H_{PI}=H_{OR}$ represents the height of input electronic document 120, $W_C=W_{PI}=W_{OR}$ represents the width of input electronic document 120, and $D_C=D_{PI}+D_{OR}$ represents a combination of $D_{PI}$ and $D_{OR}$. Further details of this stacking operation are described with regard to FIGS. 4 and 5.

At block 206, the process 200 involves generating heat maps that identify attributes of the electronic document by applying a machine-learning object-detection model 110 to the input electronic document 120. In some embodiments, the machine-learning object-detection model 110 performs a pixel-wise tagging of the input electronic document 120. For instance, machine-learning object-detection model 110 is a deep learning model that determines one or more attributes per pixel of the input electronic document 120.

The pixel-wise heat map can be represented as a tensor indicating attributes of the input electronic document 120. For example, the pixel-wise heat map determines an attribute for each pixel location (e.g., a pixel is a member of a text box, line of text, table, image, etc.) The tensor representation of the heat map may have a shape of ($H_{ML}$, $W_{ML}$, $D_{ML}$) corresponding to the height $H_{ML}$, width $W_{ML}$, and number of filters $D_{ML}$ applied by the machine-learning object-detection model 110 to the input electronic document 120. The machine-learning object-detection model 110 applies a number of filters corresponding to a number $D_{ML}$ of attribute type. A heat map of the input electronic document 120 is represented as a tensor having a multi-dimensional index ($h_{ML}$, $w_{ML}$, $d_{ML}$). For a number of attribute types $D_{ML}$, the heat map third dimension will have a size of $D_{ML}$. In an example where an image has an attribute type of 4, a pixel at location ($h_i$, $w_i$) that is determined as a pixel of the image would have a value of 1 at index ($h_i$, $w_i$, 4).

As an example, in FIG. 3, the machine-learning object-detection model 110 processes an electronic document 302b to generate a pixel-wise heat map 322 of attributes of the electronic document 302b. The machine-learning object-detection model 110 detects attributes 323, 324, 326, 328. The pixel-wise heat map 322 visually depicts these attributes of the electronic document 302b. The machine-learning object-detection model 110 generates a pixel-wise heat map 322 that contains multiple attribute types. The machine-learning object-detection model 110 can represent the heat map 322 as a heat map tensor. The machine-learning object-detection model 110 differentiates the types of attributes using the parameter $D_{ML}$ to correspond to attribute similarly to the tensors described above. In this example, the machine-learning object-detection model 110 assigns values at indexes that represent various attribute types corresponding to a depth based on attribute type.

In additional or alternative embodiments, the machine-learning object-detection model 110 determines the heat map as a series of patches of pixels. Each patch has a determined attribute as described above. The size of the patch may vary from 1 pixel by 1 pixel, up to and including the dimensions of the input electronic document 120. In this example, the tensor having a shape of ($H_{ML}$, $W_{ML}$, $D_{ML}$) contains a value for each pixel that is assigned based on the attribute of the entire patch. Thus, a patch of size 5 pixels by 5 pixels would include 25 pixels assigned the same value in the third dimension for the attribute identified by the value of d in the index (h, w, d).

At block 208, the process 200 involves computing tags by applying a fusion deep learning model to the feature maps and the heat maps. For instance, the fusion deep learning module 114 applies a fusion deep learning model to the feature map tensor with a shape of ($H_C$, $W_C$, $D_C$), which is generated by the object recognition engine 112, and the heat map tensor with a shape of ($H_{ML}$, $W_{ML}$, $D_{ML}$), which is generated by the machine-learning object-detection model 110. The fusion deep learning module 114 generates a combined feature map by applying the fusion deep learning model. The fusion deep learning module 114 generates one or more tags from the combined feature map.

In some embodiments, the feature maps and heat maps are combined by stacking their respective tensors along a dimension of interest, such as the object and attribute data represented using the dimensions $D_C$ and $D_{ML}$. A tensor stacking operation is a method of combining tensors along a dimension to fuse a common parameter of the tensors. For example, the fusion deep learning module 114 stacks the feature maps ($H_C$, $W_C$, $D_C$), representing the combined tensor generated by object recognition engine 112 (i.e., the object recognition rules and complex features), and ($H_{ML}$, $W_{ML}$, $D_{ML}$), representing attributes detected by the machine-learning object-detection model 110. The fusion deep learning module stacks ($H_C$, $W_C$, $D_C$) and ($H_{ML}$, $W_{ML}$, $D_{ML}$) along the third dimension to generate a stacked feature map of shape ($H_S$, $W_S$, $D_C$+$D_{ML}$). The fusion deep learning module 114 then processes the stacked feature map by a convolutional block, which applies a complex transformation to the input data to fuse the various attributes and objects detected and to compute a new set of attributes (or objects) for the location ($h_S$, $w_S$) of the input electronic document 120.

At block 210, the process 200 involves generating a tagged electronic document 122 by applying the tags to the electronic document. For example, at other blocks in the process 200, the electronic document processing application 102 select tags corresponding to different object types (e.g., the object types determined at blocks 202-204 as well as the object types determined at block 206). The electronic document processing application 102 modifies the input electronic document 120 to include tags identifying object types for specific regions (e.g., a "paragraph" tag for a paragraph region). Modifying the input electronic document 120 can include updating metadata of the input electronic document 120 to indicate that certain pixels or sets of pixels depict an object of a particular type.

The electronic document processing application 102 outputs the modified document as tagged electronic document 122. The electronic document processing application 102 generates tagged electronic document 122 by applying various tags that have been computed by the fusion deep learning module 114. In some embodiments, the tags are embedded in the tagged electronic document 122 as JSON or XML. Examples of tags include both individual tags and nested hierarchies of tags (e.g., a paragraph having multiple lines of text, a page hierarchy having a paragraph, image, and line of text). For instance, the fusion deep learning module 114 could generate a tagged electronic document 122 by applying a hierarchy of tags, such that the tagged electronic document 122 has a "line of text" tag nested under a "paragraph" tag, nested under a "page" tag.

Figure 4:
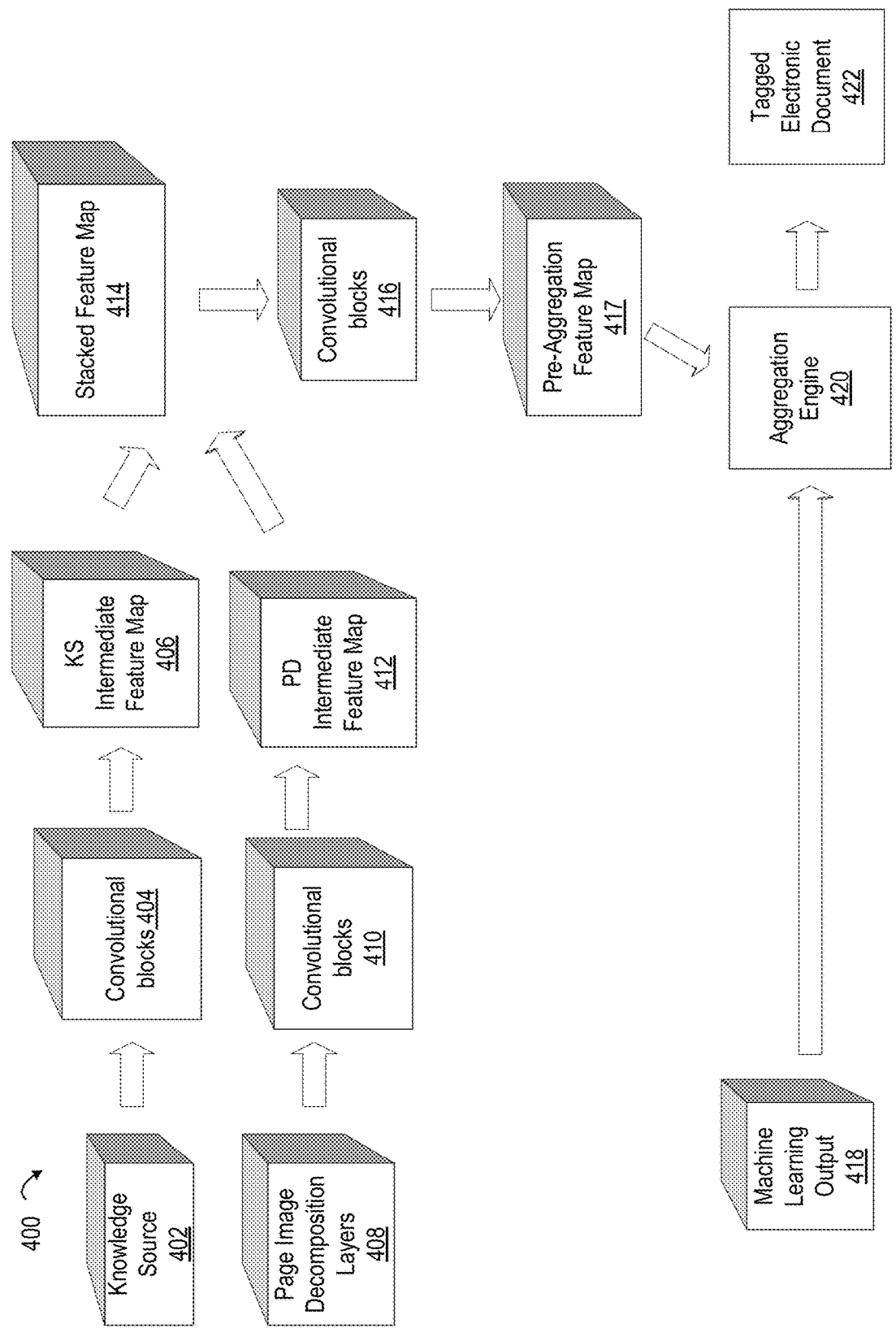
FIG. 4 depicts an example of a process flow in which a fusion deep learning module generates a tagged electronic document by performing fusion with feature maps and heat maps.

FIG. 4 depicts an example of a process flow 400 in which a fusion deep learning module 114 generates a tagged electronic document 422 by performing fusion with feature maps and heat maps. One or more operations from the process flow 400 can be used, for example, to implement block 210 of the process 200. In this example, the fusion deep learning module 114 combines a feature map representation 402, page image decomposition layers 408, and machine learning output 418 to generate a tagged electronic document 422.

In some embodiments, the object recognition engine 112 generates a feature map representation 402 and page image decomposition layers 408. An example of a feature map representation 402 is a feature map representation of performing object recognition rules 113, such as a state feature map of shape ($R_{OR}$, $H_{OR}$, $W_{OR}$, $D_{OR}$) described above with respect to FIGS. 1-3. The object recognition engine 112 generates the page image decomposition layers 408 to detect complex features indicating presence of an object (e.g., a paragraph object that has a non-standard shape, a table that has multiple lines of text in a cell, etc.) An example of a page image decomposition layer 408 is the complex features $D_{PI}$ included in the feature map with shape ($H_{PI}$, $W_{PI}$, $D_{PI}$). As described above with respect to FIG. 2, the feature map with shape ($H_{PI}$, $W_{PI}$, $D_{PI}$) can be, for example, a set of complex features generated by the object recognition engine 112 (i.e., paragraphs that continue across columns, paragraphs that are non-standard shapes). The electronic document processing application 102 represents the set of complex features as a feature map with shape ($H_{PI}$, $W_{PI}$, $D_{PI}$).

The fusion deep learning module 114 processes the feature map representation 402 and the page image decomposition layers 408 through convolutional blocks 404 and 410, respectively. Each of the convolutional blocks 404 and 408 may be a convolutional layer with learnable filters. The learnable filters can identify features of the feature map representation 402 and the page image decomposition layers 408. The learnable filters can produce, from the identified features, a knowledge source ("KS") intermediate feature map 406 with shape ($R'_{OR}$, $H'_{OR}$, $W'_{OR}$, $D'_{OR}$) and a page decomposition ("PD") intermediate feature map with shape ($H'_{PI}$, $W'_{PI}$, $D'_{PI}$). The dimensions of these intermediate feature maps are determined based on the number of filters in convolutional blocks 404 and 410 respectively. For instance, an output tensor (i.e., feature map) is determined by the size of the kernel in the convolutional layer and the stride of the convolution.

In one example, for a feature map representation 402 represented by the feature map representation 402 having shape (25, $H_{OR}$, $W_{OR}$, 20), a fully convolutional network produces an intermediate feature map with 500 channels (25×20=500) for each input electronic document 120 with dimensions (H, W). A convolutional layer with 200 filters of size (3, 3, 500) acting on a feature map of shape (H, W, 500) produces an output of (H-2, W-2, 200), unless there is padding, in which case the output size might be the same as the input size with 200 as the feature dimensionality: (H, W, 200).

The fusion deep learning module 114 stacks the KS intermediate feature map 406 and the PD intermediate feature map 412 along a dimension to generate stacked feature map 414 of shape ($H_{ST}$, $W_{ST}$, $D'_{OR}+D_{PI}$). The term $H_{ST}$ represents the height of input electronic document 120, the term $W_{ST}$ represents the width of input electronic document 120, and $D'_{OR}+D_{PI}$ represents the concatenation of $D'_{OR}$ and $D_{PI}$. Thus, the stacked feature map 414 ($H_{ST}$, $W_{ST}$, $D'_{OR}+D_{PI}$) includes a set of identified objects from the feature map representation 402 and page image decomposition layers 408 that cumulatively represents the output of the object recognition engine 112. The fusion deep learning module 114 processes the stacked feature map 414 ($H_{ST}$, $W_{ST}$, $D'_{OR}+D_{PI}$) through convolutional blocks 416 to generate pre-aggregation feature map 417 ($H'_{ST}$, $W'_{ST}$, $D'_{ST}$). The pre-aggregation feature map 417 may have the same or different dimensions as stacked feature map 414 depending on the type and number of filters applied by convolutional blocks 416 as described with regard to convolutional blocks 404 and 410 above. In some embodiments, convolutional blocks 416 perform deconvolution operations on the stacked feature map 414.

The machine learning output 418 is a heat map generated from the machine-learning object-detection model 110. The machine-learning object-detection model 110 represents the machine learning output 418 as a heat map tensor, having shape ($H_{ML}$, $W_{ML}$, $D_{ML}$) corresponding to the height, width, and number of attribute types $D_{ML}$ detected in the input electronic document 120. In some embodiments, the number of attribute types $D_{ML}$ is equal to the number of filters applied by machine-learning object-detection model 110. The number of attribute types $D_{ML}$ may vary based on document format (e.g., a document with embedded images, a purely text document, etc.), number of possible attributes (e.g., classes of objects), or file type of the input electronic document 120. The machine-learning object-detection model 110 provides the machine learning output 418 to the fusion deep learning module 114. The fusion deep learning module 114 executes an aggregation engine 420 that combines the machine learning output 418 with the pre-aggregation feature map 417.

In some embodiments, the aggregation engine 420 performs a stacking operation on the pre-aggregation feature map 417 and the machine learning output 418 along a dimension, such as $D_{ST}$ and $D_{ML}$. The aggregation engine 420 generates an aggregated feature map having shape ($H_A$, $W_A$, $D_A$) where $D_A=D_{ST}+D_{ML}$ by concatenating the object and attribute data. The fusion deep learning module 114 computes the correct tag for a location in the electronic document (h, w) by analyzing the object and attribute data in the dimension $W_A$.

For example, the fusion deep learning module 114 applies aggregation engine 420 to stack the pre-aggregation feature map 417 with shape ($H'_{ST}$, $W'_{ST}$, $D'_{ST}$) having a value of "1" at index ($h'_{ST}$, $w'_{ST}$, 1) and machine learning output 418 with shape ($H_{ML}$, $W_{ML}$, $D_{ML}$) having a value of "1" at an index (h, $w_{ML}$, 1). The index "1" indicates that a first object type and attribute type, in this example an object of "paragraph," and an attribute of "paragraph," respectively. The value of "1" at these indices indicates the presence of the object "paragraph" and attribute "paragraph." In this example, the aggregation engine 420 generates an aggregated feature map having shape ($H_A$, $W_A$, $D'_{ST}$,$D_{ML}$). The fusion deep learning module 114 computes the proper tag of "paragraph" because the value at the location ($h_A$, $W_A$) correspond to parameters which indicate a "paragraph" tag for depth $d'_{ST}$ and $d_{ML}$. Accordingly, the fusion deep learning module 114 computes other tags for each location (h, w) of input electronic document 120.

The electronic document processing application 102 applies the computed tags to the input electronic document 120 to generate tagged electronic document 422. The electronic document processing application applies the computed tags as metadata to the input electronic document 120. For example, the electronic document processing application 102 converts the various tags into document metadata such as an XML document or JSON document. The electronic document processing application 102 outputs the tagged electronic document 422. In some embodiments, the electronic document processing application 102 outputs the tagged electronic document 422 to a presentation device illustrating the various tagged objects to a user. Alternatively, the electronic document processing application 102 outputs the tagged electronic document 422 to another application or server for storage of tagged electronic document 422.

Figure 5:
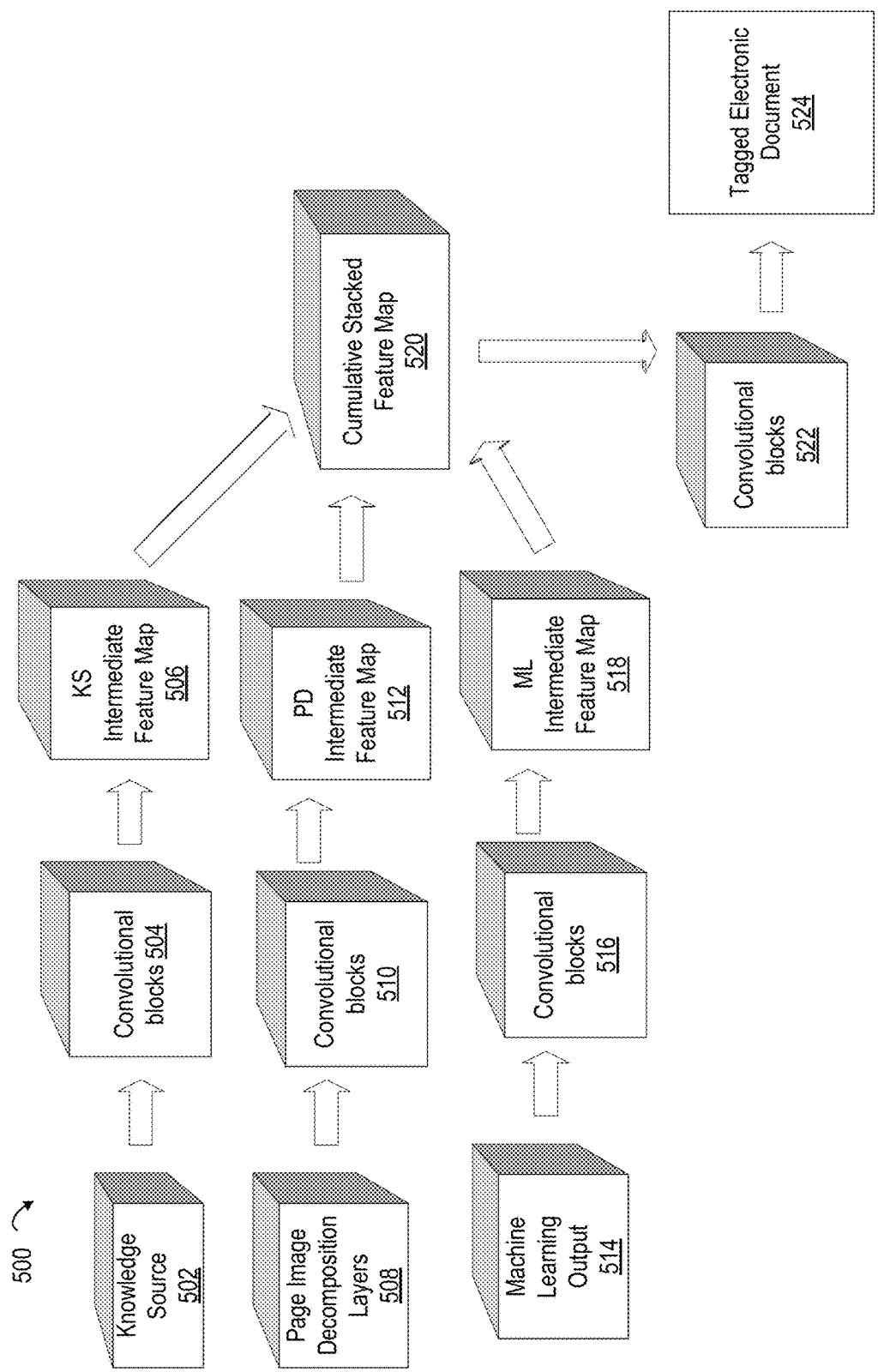
FIG. 5 depicts another example of generating a tagged electronic document by applying a fusion deep learning module to feature maps, according to certain embodiments of the present disclosure.

FIG. 5 depicts another example of generating a tagged electronic document 122 by applying a fusion deep learning module 114 to feature maps. One or more operations depicted in FIG. 5 can be used, for example, to implement block 210 of the process 200. In this example, the fusion deep learning module 114 can process multiple feature maps, such as the KS intermediate feature map 506 having shape ($H_{OR}$, $W_{OR}$, $D_{OR}$), PD intermediate feature map 512 having shape ($H_{PI}$, $W_{PI}$, $D_{PI}$), and ML intermediate feature map 518 having shape ($H_{ML}$, $W_{ML}$, $D_{ML}$).

The object recognition engine 112 accesses a feature map representation 502 and a page image decomposition layers 508 in a manner similar to the example described with respect to FIG. 4. The machine-learning object-detection model 110 also generates the machine learning output 514 in a manner similar to the example described with respect to FIG. 4. The fusion deep learning module 114 processes the feature map representation 502, the page image decomposition layers 508, and the machine learning output 514 through convolutional blocks 504, 510, 516, respectively. The convolutional blocks 504, 510, and 516 include multiple convolutional layers for performing filtering or pooling similar to the convolutional blocks described in relation to FIG. 4. The fusion deep learning module 114 generates KS intermediate feature map 506, the PD intermediate feature map 512, and the machine-learning (ML) intermediate feature map 518 as a result of the processing by the convolutional block 504, 510, and 516. The fusion deep learning module 114 stacks KS intermediate feature map 506, PD intermediate feature map 512, and ML intermediate feature map 518 along the dimensions $D_{OR}, D_{PI}$, and $D_{ML}$.

The fusion deep learning module 114 can generate a cumulative stacked feature map 520 having shape ($H_{CS}$, $W_{CS}$, $D_{OR}+D_{PI}+D_{ML}$) by stacking the KS intermediate feature map 506 having shape ($H_{OR}$, $W_{OR}$, $D_{OR}$), the PD intermediate feature map 512 having shape ($H_{PI}$, $W_{PI}$, $D_{PI}$), and the ML intermediate feature map 518 having shape ($H_{ML}$, $W_{ML}$, $D_{ML}$). In this example, $D_{OR}+D_{PI}+D_{ML}$ can be a concatenation along the dimensions of $D_{OR}$, $D_{PI}$, and $D_{ML}$. The cumulative stacked feature map 520 therefore includes indications of a set of identified objects from object recognition rules 113 generated by the object recognition engine 112, a set of complex features from page image decompositions generated by the object recognition engine 112, and a heat map tensor from a pixel-wise heat map generated by the machine-learning object-detection model 110. The fusion deep learning module 114 computes the correct tags for each location (h, w) of the input electronic document 120 using the values of each index of the cumulative stacked feature map 520.

For instance, the fusion deep learning module 114 computes the various tags from each value of the indices of intermediate feature maps. In this example, the KS intermediate feature map has a value of "1" at the index ($h_{OR}$, $W_{OR}$, 1), the PD intermediate feature map 512 has a value of "1" at the index ($h_{PI}$, $w_{PI}$, 1), and the ML intermediate feature map 518 has a value of "1" at the index ($h_{ML}$, $w_{ML}$, 1). The value "1" indicates an object of "paragraph," "1" indicates a complex feature of "paragraph," and "1" indicates an attribute of "paragraph," respectively. The fusion deep learning module generates cumulative stacked feature map 520 having shape ($H_{CS}$, $W_{CS}$, $D_{OR}+D_{PI}+D_{ML}$). In this example, the fusion deep learning module computes the tag by evaluating the values at each index to determine the proper tag of "paragraph".

In this example, the fusion deep learning module 114 computes the proper tag of "paragraph." The proper tag can be computed because the value of the tensor at the location ($h_{CS}$, $w_{CS}$) corresponds to a "paragraph" tag. Accordingly, the fusion deep learning module 114 computes other tags for each location (h, w) of input electronic document 120.

In another example, the fusion deep learning module 114 computes the various tags from each index of the intermediate feature maps. In this example, the KS intermediate feature map has a value of "1" at index ($h_{OR}$, $w_{OR}$, 1), the PD intermediate feature map 512 has a value of "0" at index ($h_{PI}$, $w_{PI}$, 1), and the ML intermediate feature map 518 has a value of "1" at index ($h_{ML}$, w, 1). The value "1" indicates an object of "paragraph," "0" indicates a lack of a complex feature of "paragraph," and "1" indicates an attribute of "paragraph," respectively. The fusion deep learning module 114 generates cumulative stacked feature map 520 having shape ($H_{CS}$, $W_{CS}$, $D_{OR}+D_{PI}+D_{ML}$). In this example, the fusion deep learning module computes the tag by evaluating the values "1", "0", and "1" to determine the proper tag of "paragraph". In this example, the values at the respective indices of two out of the three feature maps had identified the same type of object/attribute while one feature map indicate a lack of the complex feature. In this example, the fusion deep learning module 114 applies a statistical analysis to determine that 66% of the indications correspond to the tag "paragraph," however, other determination methods are possible. Alternatives include applying weights to each feature map, implementing a machine-learning decision tree, other machine-learning processes, or additional deep learning layers (e.g., convolution, ReLU, maxpooling, etc.). The fusion deep learning module 114 computes the proper tag of "paragraph" because the value of an index at location ($h_{CS}$, $w_{CS}$) corresponds to parameters that indicate a "paragraph" tag. Accordingly, the fusion deep learning module 114 computes other tags for each location (h, w) of input electronic document 120.

The fusion deep learning module 114 processes the cumulative stacked feature map 520 through convolutional blocks 522 to perform multiple filtering or pooling convolutional layers as described previously. In some cases, convolutional blocks 522 perform deconvolutional operations. The electronic document processing application applies the computed tags as metadata to the input electronic document 120. For example, the electronic document processing application 102 converts the various tags into document metadata such as an XML document or JSON document. The electronic document processing application 102 outputs the tagged electronic document 524. In some embodiments, the electronic document processing application 102 outputs the tagged electronic document 524 to a presentation device illustrating the various tagged objects to a user. Alternatively, the electronic document processing application 102 outputs the tagged electronic document 524 to another application or server for storage of tagged electronic document 524.

Figure 6:
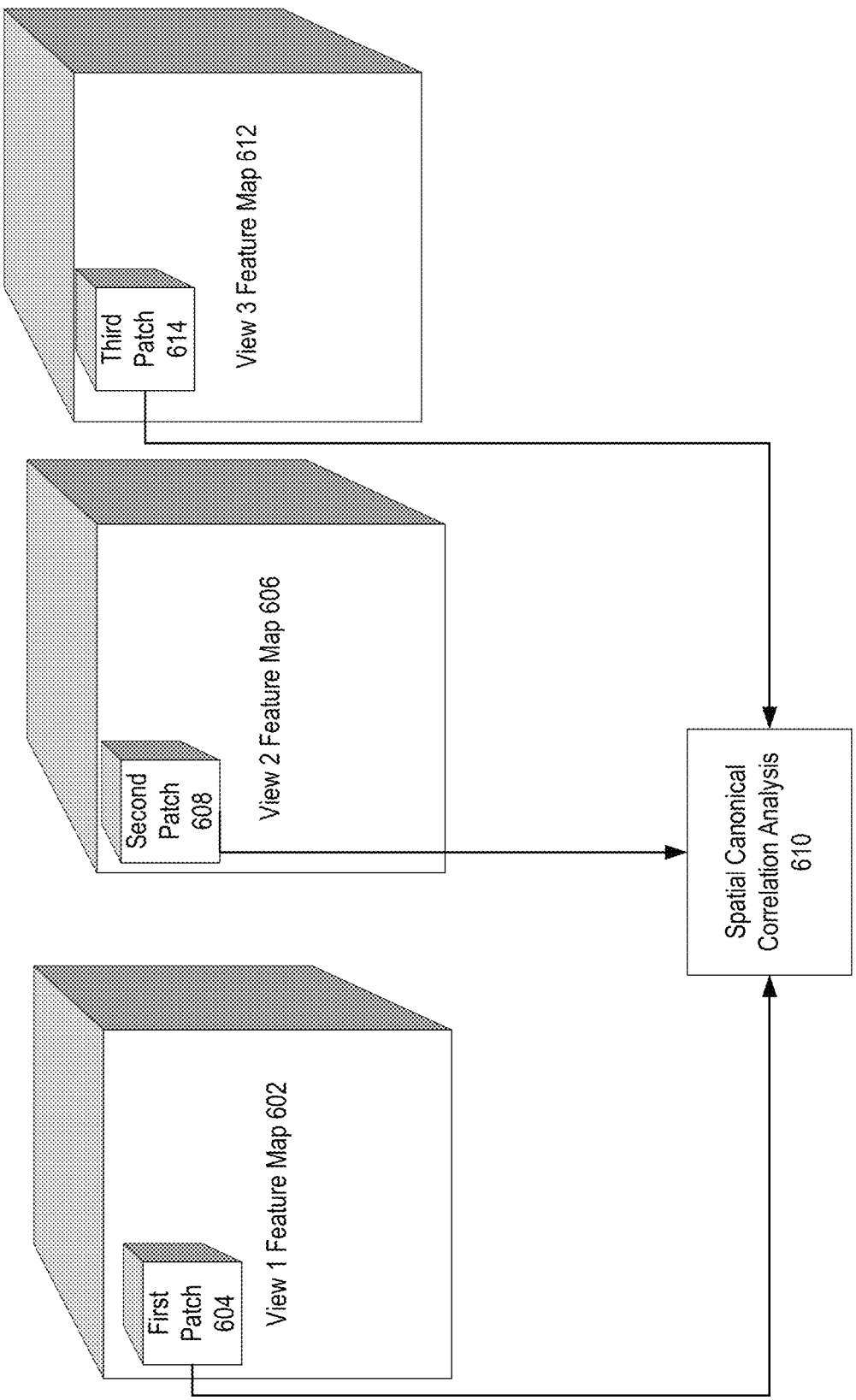
FIG. 6 depicts an example of using spatial canonical correlation analysis on multiple views of feature maps, according to certain embodiments of the present disclosure.

FIG. 6 depicts an example of using spatial canonical correlation analysis on multiple views of feature maps. One or more operations in this example can be used to implement block 208, as described above with respect to FIG. 2. Generally, canonical correlation analysis applies transformations to linear projections of two or more views, in a vector space (e.g., a two-dimensional vectors), that are maximally correlated. An example of canonical correlation analysis between two vector views can be represented by $$(\theta_1^*, \theta_2^*) = \operatorname*{argmaxcorr}_{\theta_1 \theta_2}(f_1(X_1; \theta_1), (f_2(X_2; \theta_2),$$

where ($\theta_1^*$, $\theta_2^*$) can be found by following the gradient of the correlation objective estimated by training data. $\theta_1$ represents the vector of all parameters in the first view and $\theta_2$ represents the vector of all parameters in the second view. $X_1$ represents an instance in the first view, and $X_2$ represents an instance in the second view. In this example, the ($f_1(X_1; \theta_1$) indicates the final representation for a network with a specified number of layers and ($f_2(X_2; \theta_2)$ indicates the final representation for a different network with a specified number of layers. Implementing CCA in this manner ensures that the final representations are maximally correlated.

Because of the multi-dimensional format of the feature map and heat map, performing canonical correlation analysis over spatial neighborhoods provides improvements that are not achievable using conventional methods. Spatial canonical correlation analysis (SCCA) 610 is a method of finding the maximum correlation between multiple views of the input electronic document 120. A view is defined as an intermediate feature maps having two or more dimensions, such as KS intermediate feature map 506, PD intermediate feature map 512, and ML intermediate feature map 518, each of which inherently have spatial information.

As illustrated by FIG. 6, a patch-wise approach defines a spatial region in one view of the intermediate feature maps whose cross correlation is to be maximized with the corresponding region of the second view and third view. SCCA 610 maximizes correlation between two or more views by passing them through multiple stacked layers of nonlinear transformations. The fusion deep learning module 114 applies SCCA 610 a loss to the intermediate feature maps to ensure that the multiple views are correlated before stacking the various views.

For example, FIG. 6 depicts an embodiment where fusion deep learning module 114 performs SCCA 610 with a view 1 feature map 602 and first patch 604, a view 2 feature map 606 having a second patch 608, and a view 3 feature map 612 having a third patch 614. First patch 604, second patch 608, and third patch 614 each define a spatial region of the KS intermediate feature map 506, the PD intermediate feature map 512, and the ML intermediate feature map 512. First patch 604, second patch 608, and third patch 614 may have a shape between (1, 1, D) up to the shape of the feature map (H, W, D). For example, a first patch 604 having a shape of (1, 1, D) indicates that the fusion deep learning module 114 performs SCCA 610 at the per pixel level across channels, while a first patch 604 having a shape of (H, W, D) indicates that the SCCA 610 is performed at the per page level (i.e., the filter map or channel level). The first patch 604, second patch 608, and third patch 614 define the spatial regions of the feature maps (view 1 feature map 602, view 2 feature map 606, and view 3 feature map 612) where the canonical correlation analysis maximizes correlation between the feature maps.

The fusion deep learning module 114 performs SCCA 610 for each location in the various views of feature maps by translating the location of the first patch 604, second patch 608, and third patch 614 to various positions within the view 1 feature map 602, the view 2 feature map 606, and the view 3 feature map 612, respectively. The fusion deep learning module 114 applies the patch-wise SCCA 610 to the view 1 feature map 602, view 2 feature map 606, and view 3 feature map 612 to maximize correlation of the various patches at each location. In other words, for a patch size of (1, 1, D), the view 1 feature map 602, view 2 feature map 606, and view 3 feature map 612 have maximized correlation at each pixel location. The patch size can vary between (1, 1, D) and (H, W, D). Optimizing the size of the patch between (1, 1, D) and (H, W, D) may allow the stochastic gradient descent (SGD) to converge to local minima more quickly than either a pixel (1, 1, D) or channel (H, W, D) level implementation. The SGD is an iterative method for optimizing a differentiable objective function using stochastic approximation of a gradient descent optimization. SCCA 610 loss is applied to the feature maps, such as KS intermediate feature map 506, PD intermediate feature map 512, and ML intermediate feature map 518 before the stacking is performed.

Experimental Results

The two tables below show experimental results of three approaches. The late fusion row corresponds to experiments that implement the embodiment and description of FIG. 4. The feature map row corresponds to experiments that implement the embodiment and description of FIG. 5. The "feature map+SCCA" row corresponds to experiments that implement embodiments described above with respect to FIGS. 5 and 6. As shown below in Tables 1 and 2, parameters indicate the number of filters in the deep learning model, epochs represent the number of revolutions through training data, precision is the percentage of relevant instances among the retrieved instances, recall is the percentage of relevant instances retrieved among the total amount of relevant instances, and the F1 measure is the harmonic mean of precision and recall.

TABLE 1

Pixel Wise Performance

| Method | # Parameters | Epochs | Precision | Recall | F1 |
|---|---|---|---|---|---|
| PageSegmentation | — | — | .589 | .844 | .694 |
| Late Fusion | 3.86M | 12 | .62 | .841 | .714 |
| Feature Map | 4.32M | 2.25 | .858 | .551 | .671 |
| Feature Map + SCCA | 4.32M | 2 | .646 | .81 | .718 |

TABLE 2

Page Wise Performance

| Method | # Parameters | Epochs | Precision | Recall | F1 |
|---|---|---|---|---|---|
| PageSegmentation | — | — | .557 | .84 | .659 |
| Late Fusion | 3.86M | 12 | .573 | .855 | .675 |
| Feature Map | 4.32M | 2.25 | .599 | .775 | .663 |
| Feature Map + SCCA | 4.32M | 2 | .61 | .852 | .70 |

As shown in the above results, embodiments incorporating the feature maps and SCCA 610 improved the required training time by a factor of 6. Also, the precision of the system increased with only a minor reduction in recall rate.

Example of a Computing System for Implementing Certain Embodiments

Figure 7:
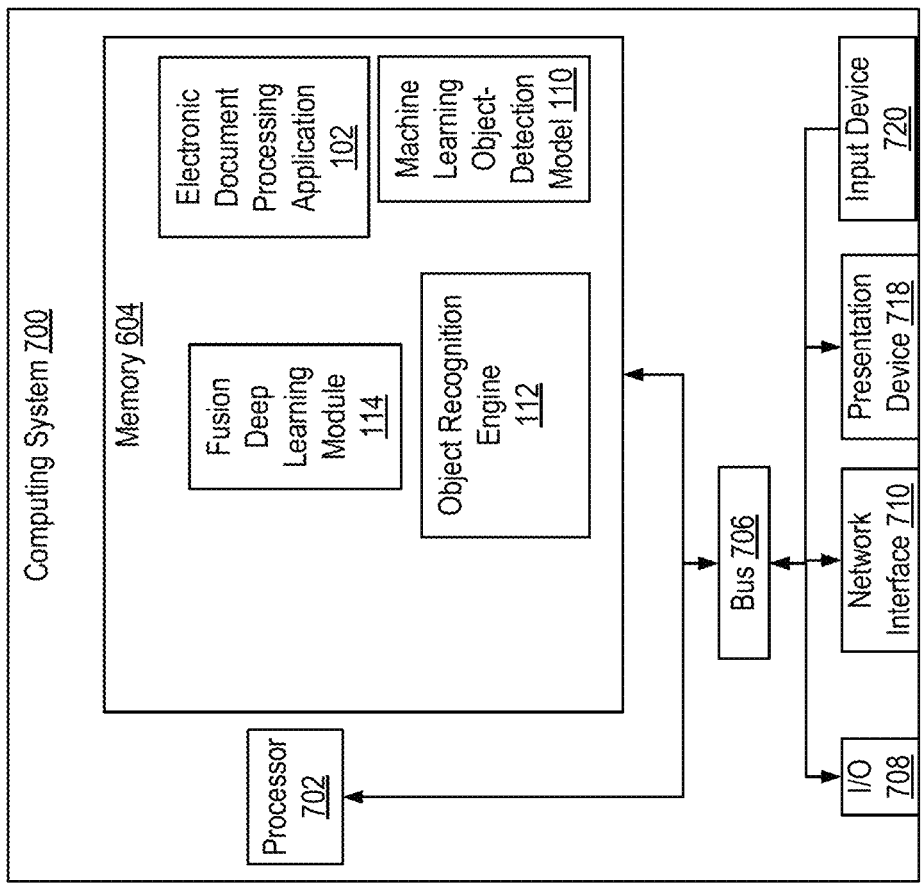
FIG. 7 depicts an example of the computing system, according to certain embodiments of the present disclosure.

Any suitable computing system or group of computing systems can be used for performing the operations described herein. For example, FIG. 7 depicts an example of the computing system 700. The implementation of computing system 700 could be used for one or more of an electronic document processing application 102, an object recognition engine 112 and a fusion deep learning module 114. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for object recognition rules 113, electronic document processing application 102, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices, an input device 720, a presentation device 718, or other input or output devices. For example, the computing environment 100 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes electronic document processing application 102 that configures the processor 702 to perform one or more of the operations described herein. Examples of the electronic document processing application 102 include, in various embodiments, electronic document processing executed by the electronic document processing application 102, fusion deep learning module 114, the object recognition engine 112, the machine-learning object-detection model 110, or other suitable applications that perform one or more operations described herein (e.g., one or more development applications for generation of the tagged electronic document 122 or object recognition rules 113). The electronic document processing application 102 may be resident in the memory device 704 or any suitable computer-readable medium and may be executed by the processor 702 or any other suitable processor.

In some embodiments, one or more memory devices 704 stores program data such as parameters and settings for the fusion deep learning module 114, object recognition rules 113, or the machine-learning object-detection model 110. In additional or alternative embodiments, one or more of the programs, documents, models, and functions described herein are stored in different memory devices 704 accessible via a data network.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an electronic document processing application 102) via a data network using the network interface device 710.

In some embodiments, the computing system 700 also includes the input device 720 and the presentation device 718 depicted in FIG. 7. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the electronic document processing application 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for transforming an electronic document into a tagged electronic document having tags that identify categories of document objects in the tagged electronic document, the method comprising:
identifying sets of identified objects for the electronic document by applying a set of object-recognition rules to the electronic document, where each object-recognition rule generates a respective set of identified objects;
generating feature maps from the sets of identified objects, wherein a feature map represents a set of identified objects, wherein generating the feature map of the set of identified objects comprises:
representing, as a first tensor, a state of an object recognition engine, wherein the state of the object recognition engine changes based on identifying an object;
representing, as a second tensor, a series of page images; and
stacking, along a dimension of the first tensor and the second tensor, the first tensor and the second tensor to form a stacked feature map;
generating a heat map of the electronic document by applying a page-segmentation machine-learning model to the electronic document, wherein the heat map identifies attributes of the electronic document including object candidates;
computing a tag by applying a fusion deep learning module to the feature map and the heat map, wherein the fusion deep learning module correlates a document object identified by the feature map with an attribute of the electronic document identified by the heat map; and
generating the tagged electronic document by applying the tag to the electronic document.

2. The method of claim 1, wherein the computing the tag by applying the fusion deep learning module comprises:
generating a pre-aggregation feature map by applying a convolutional neural network to the stacked feature map; and
generating an aggregated feature map by aggregating the pre-aggregation feature map and the heat map, wherein the aggregating comprises:
stacking the pre-aggregation feature map and the heat map along a dimension of the pre-aggregation feature map and heat map; and
computing the tag for each object of the aggregated feature map by assigning the tag based on a determined object indicated by the aggregated feature map at each location of the aggregated feature map.

3. The method of claim 1, wherein the computing the tag by applying the fusion deep learning module further comprises:
representing the heat map as a third tensor,
generating a cumulative stacked feature map stacking the third tensor along a dimension of the stacked feature map, wherein the dimension of the cumulative stacked feature map corresponds to a dimension of the third tensor; and
applying a convolutional neural network to the cumulative stacked feature map.

4. The method of claim 1 wherein the heat map is a pixel-wise representation of the electronic document, and wherein the heat map is generated by:
applying a machine learning model having a number of filters to the electronic document;
assigning a pixel of the heat map to the attribute based on a pixel location and proximity to other pixels with assigned attributes; and
outputting the heat map of pixels with assigned attributes.

5. The method of claim 3, wherein the computing the tag by applying the fusion deep learning module further comprises:
performing spatial canonical correlation analysis on the first tensor, the second tensor, and the third tensor to maximize correlation between the first tensor, the second tensor, and the third tensor, wherein the spatial canonical correlation analysis comprises:
defining a first spatial region in the first tensor;
defining a second spatial region in the second tensor;
defining a third spatial region in the third tensor;
aligning the first spatial region with the second spatial region and the third spatial region by applying a spatial loss coefficient that maximizes a cross-correlation between the first spatial region and the second spatial region and third spatial region; and
wherein the cross-correlation is applying a non-linear transformation to the first tensor, the second tensor, and the third tensor.

6. The method of claim 5, wherein the performing spatial canonical correlation analysis comprises:
computing a spatial canonical correlation analysis loss term by translating the first spatial region in the first tensor, the second spatial region in the second tensor, and the third spatial region in the third tensor to corresponding different locations in an iterative process that is performed until all locations in the first tensor, the second tensor, and the third tensor have been processed.

7. A system comprising:
a processing device; and
a non-transitory computer-readable medium communicatively coupled to the processing device, wherein the processing device is configured to execute program code stored in the non-transitory computer-readable medium and thereby perform operations comprising:
identifying sets of identified objects for an electronic document by applying a set of object-recognition rules to the electronic document, where each object-recognition rule generates a respective set of identified objects;
generating feature maps from the sets of identified objects, wherein a feature map represents a set of identified objects, wherein generating the feature map of the set of identified objects comprises:
representing, as a first tensor, a state of an object recognition engine, wherein the state of the object recognition engine changes based on identifying an object;
representing, as a second tensor, a series of page images; and
stacking, along a dimension of the first tensor and the second tensor, the first tensor and the second tensor to form a stacked feature map;
generating a heat map of the electronic document by applying a page-segmentation machine-learning model to the electronic document, wherein each heat map identifies attributes of the electronic document including object candidates;

computing a tag by applying a fusion deep learning module to the feature map and the heat map, wherein the fusion deep learning module correlates a document object identified by the feature map with an attribute of the electronic document identified by the heat map; and generating a tagged electronic document by applying the tag to the electronic document.

8. The system of claim 7 wherein the computing the tag by applying the fusion deep learning module comprises:

generating a pre-aggregation feature map by applying a convolutional neural network to the stacked feature map; and generating an aggregated feature map by aggregating the pre-aggregation feature map and the heat map, wherein the aggregating comprises:

stacking the pre-aggregation feature map and the heat map along a dimension of the pre-aggregation feature map and heat map; and computing the tag for each object of the aggregated feature map by assigning the tag based on a determined object indicated by the aggregated feature map at each location of the aggregated feature map.

9. The system of claim 7 wherein the computing the tag by applying the fusion deep learning module further comprises:

representing the heat map as a third tensor, generating a cumulative stacked feature map stacking the third tensor along a dimension of the stacked feature map, wherein the dimension of the cumulative stacked feature map corresponds to a dimension of the third tensor; and applying a convolutional neural network to the cumulative stacked feature map.

10. The system of claim 7 wherein the heat map is a pixel-wise representation of the electronic document, and wherein the heat map is generated by:

applying a machine learning model having a number of filters to the electronic document;

assigning a pixel of the heat map to the attribute based on a pixel location and proximity to other pixels with assigned attributes; and outputting the heat map of pixels with assigned attributes.

11. The system of claim 9 wherein the computing the tag by applying the fusion deep learning module further comprises:

performing spatial canonical correlation analysis on the first tensor, the second tensor, and the third tensor to maximize correlation between the first tensor, the second tensor, and the third tensor, wherein the spatial canonical correlation analysis comprises:

defining a first spatial region in the first tensor;
defining a second spatial region in the second tensor;
defining a third spatial region in the third tensor;
aligning the first spatial region with the second spatial region and the third spatial region by applying a spatial loss coefficient that maximizes a cross-correlation between the first spatial region and the second spatial region and third spatial region; and wherein the cross-correlation is applying a non-linear transformation to the first tensor, the second tensor, and the third tensor.

12. The system of claim 11 wherein the performing spatial canonical correlation analysis comprises:

computing a spatial canonical correlation analysis loss term by translating the first spatial region in the first tensor, the second spatial region in the second tensor, and the third spatial region in the third tensor to corresponding different locations in an iterative process that is performed until all locations in the first tensor, the second tensor, and the third tensor have been processed.

13. A non-transitory computer-readable medium having program code that is stored thereon, the program code executable by one or more processing devices for performing operations comprising:

identifying sets of identified objects for an electronic document by applying a set of object-recognition rules to the electronic document, where each object-recognition rule generates a respective set of identified objects;

generating feature maps from the sets of identified objects, wherein a feature map represents a set of identified objects, wherein generating the feature map of the set of identified objects comprises:

representing, as a first tensor, a state of an object recognition engine, wherein the state of the object recognition engine changes based on identifying an object;

representing, as a second tensor, a series of page images; and stacking, along a dimension of the first tensor and the second tensor, the first tensor and the second tensor to form a stacked feature map;

generating a heat map of the electronic document by applying a page-segmentation machine-learning model to the electronic document, wherein each heat map identifies attributes of the electronic document including object candidates;

computing a tag by applying a fusion deep learning module to the feature map and the heat map, wherein the fusion deep learning module correlates a document object identified by the feature map with an attribute of the electronic document identified by the heat map; and generating a tagged electronic document by applying the tag to the electronic document.

14. The non-transitory computer-readable medium of claim 13 wherein the operation of computing the tags by applying the fusion deep learning module comprises:

generating a pre-aggregation feature map by applying a convolutional neural network to the stacked feature map; and generating an aggregated feature map by aggregating the pre-aggregation feature map and the heat map, wherein the aggregating comprises:

stacking the pre-aggregation feature map and the heat map along a dimension of the pre-aggregation feature map and heat map; and computing the tag for each object of the aggregated feature map by assigning the tag based on a determined object indicated by the aggregated feature map at each location of the aggregated feature map.

15. The non-transitory computer-readable medium of claim 13 wherein the operation of computing the tags by applying the fusion deep learning module further comprises:

representing the heat map as a third tensor, generating a cumulative stacked feature map stacking the third tensor along a dimension of the stacked feature map, wherein the dimension of the cumulative stacked feature map corresponds to a dimension of the third tensor; and applying a convolutional neural network to the cumulative stacked feature map.

16. The non-transitory computer-readable medium of claim 15 wherein the operation of computing the tags by applying the fusion deep learning module further comprises:
performing spatial canonical correlation analysis on the first tensor, the second tensor, and the third tensor to maximize correlation between the first tensor, the second tensor, and the third tensor, wherein the spatial canonical correlation analysis comprises:
defining a first spatial region in the first tensor;
defining a second spatial region in the second tensor;
defining a third spatial region in the third tensor;
aligning the first spatial region with the second spatial region and the third spatial region by applying a spatial loss coefficient that maximizes a cross-correlation between the first spatial region and the second spatial region and third spatial region; and
wherein the cross-correlation is applying a non-linear transformation to the first tensor, the second tensor, and the third tensor.

17. The non-transitory computer-readable medium of claim 16 wherein the operation of performing spatial canonical correlation analysis comprises:
computing a spatial canonical correlation analysis loss term by translating the first spatial region in the first tensor, the second spatial region in the second tensor, and the third spatial region in the third tensor to corresponding different locations in an iterative process that is performed until all locations in the first tensor, the second tensor, and the third tensor have been processed.

* * * * *